United States Patent [19]

Swain

[11] Patent Number: 5,357,687
[45] Date of Patent: Oct. 25, 1994

[54] METHOD AND APPARATUS FOR DRYING/CURING RIGID CYLINDRICAL AND FLEXIBLE BELT SUBSTRATES

[75] Inventor: Eugene A. Swain, Webster, N.Y.

[73] Assignee: Xerox Corporation, Stamford, Conn.

[21] Appl. No.: 96,358

[22] Filed: Jul. 23, 1993

[51] Int. Cl.$^5$ .............................................. F26B 25/00
[52] U.S. Cl. .......................................... 34/247; 34/104
[58] Field of Search ........................ 34/1 B, 17, 68, 39; 219/10.41; 118/643, 642

[56] References Cited

U.S. PATENT DOCUMENTS

| | | | |
|---|---|---|---|
| 2,040,767 | 5/1936 | Dudley | 34/1 B |
| 4,849,598 | 7/1989 | Nozaki et al. | 34/1 B |
| 4,967,487 | 11/1990 | Urquhart | 34/39 |
| 5,032,052 | 7/1991 | Swain . | |
| 5,038,707 | 8/1991 | Swain et al. . | |
| 5,079,854 | 1/1992 | Hammond et al. . | |

Primary Examiner—Henry A. Bennett
Attorney, Agent, or Firm—Oliff & Berridge

[57] ABSTRACT

A method and apparatus for drying or curing rigid cylindrical and flexible belt substrates includes: a curing chamber defining a central axis; a support structure selectively receivable within the curing chamber and including a support for at least one substrate along the central axis which rotates the at least one substrate about the central axis; a curing mechanism surrounding the at least one substrate within the curing chamber for expelling temperature controlled low velocity air toward the at least one substrate as the at least one substrate rotates about the central axis without axial movement relative to the curing chamber; and inductive coils surrounding at least a portion of the at least one substrate within the curing chamber for indirectly heating the at least one substrate. Preferably, the at least one substrate is dried/cured by combination of indirect RF induction heating at the same time or prior to low velocity air impingement. By varying the frequency, power, coil diameter and spacing, heatup rates and temperatures can be very closely controlled and very rapid heatup rates can be achieved.

23 Claims, 2 Drawing Sheets

METHOD AND APPARATUS FOR DRYING/CURING RIGID CYLINDRICAL AND FLEXIBLE BELT SUBSTRATES

BACKGROUND OF THE INVENTION

1. Field of the Invention

The invention relates to a method and apparatus for drying or curing rigid cylindrical and flexible belt substrates. More particularly, the invention relates to an efficient method and apparatus that is useful in drying or curing spray-coated photoreceptor substrates (metallic or conductive plastic rigid cylinders, metallic or conductive plastic flexible seamless belts, and the like) and, for that matter, any smooth surface object subject to strict cleanliness standards during manufacture.

2. Description of Related Art

A photoreceptor is a rigid cylinder or flexible belt device used in a xerographic apparatus. The photoreceptor substrate is coated with one or more layers of a photoconductive material, i.e., a material whose electrical conductivity changes upon illumination. In xerographic use, an electrical potential is applied across the photoconductive layer and then exposed to light from an image. The electrical potential of the photoconductive layer decays at the portion irradiated by the light from the image, leaving a distribution of electrostatic charge corresponding to the dark areas of the projected image. The electrostatic latent image is made visible by development with a suitable powder. Better control of the coating quality yields better imaging performance.

The coating of a substrate may be accomplished through an automated four step process, whereby the substrate to be coated is first loaded on a support arm structure (step 1) which then moves the substrate to successive processing stations. The substrate is first moved to the cleaning station (step 2) which includes a cleaning chamber for receiving the support arm bearing the substrate and having decontaminating means for removing contaminates from the substrate; and then on to a coating station (step 3) which includes a coating chamber for receiving the support arm bearing the substrate and having an applicator for applying a coating formulation onto the substrate. Finally, the substrate is moved to a curing station (step 4) which includes a curing chamber for receiving the support arm bearing the coated substrate and has curing means for curing the coating on the substrate. An apparatus and method for processing as described above, is detailed generally in U.S. Pat. No. 5,032,052 to Swain, 5,038,707 to Swain et al. and U.S. Pat. No. 5,079,854 to Hammond et al., which are incorporated herein by reference and referred to for purposes of describing a substrate coating and manufacturing process. In addition, as well known in the art, other suitable methods for coating photoconductive layers can be utilized, such as dip coating, vacuum deposition and the like.

The method and apparatus described herein is preferably adaptable for use with either an airless or air atomized spray coating system. However, in an air atomized spray coating system, an air assisted automatic spray gun using high velocity air to atomize the coating formulation is used to spray the coating onto the substrate. Due to high mass transfer rates intrinsic to the use of atomizing air, this method entails considerable evaporative loss of solvent from the spray droplets and requires the use of slow evaporating solvents to prevent excessive solvent loss before the droplets arrive at the substrate. It is difficult to use this method in a sealed environment, and thus difficult to control the solvent humidity surrounding the substrates prior to, during, or after the coating process. In addition, the air atomized spray method creates a considerable amount of overspray which results in higher material usage.

SUMMARY OF THE INVENTION

It is thus an object of the invention to provide a more efficient method and apparatus for drying or curing rigid cylindrical and flexible belt substrates during manufacture.

Another object of the invention is to provide a method and apparatus which reduces the time required for drying or curing photoreceptor substrates during manufacture.

It is still another object of the invention to provide a method and apparatus which does not require large volumes of heated air to dry or cure photoreceptor substrates and reduces critical space requirements and equipment costs while maintaining or improving throughput.

These and other objects and advantages are obtained by the inventive method and apparatus for drying or curing rigid cylindrical and flexible belt substrates by combined action of temperature controlled low velocity air, which is expelled toward the at least one substrate while it rotates about a central axis in the drying-/curing chamber, and inductive coils indirectly heating the at least one substrate, the coils being positioned either around the entire axial length of the at least one substrate or at an entrance opening through which the at least one substrate is inserted.

In particular, the inventive apparatus includes a curing chamber defining a central axis; a support structure selectively receivable within the curing chamber and including means for supporting at least one substrate along the central axis and means for rotating the at least one substrate about the central axis; curing means surrounding the at least one substrate within the curing chamber for expelling temperature controlled low velocity air toward the at least one substrate as the at least one substrate rotates about the central axis without axial movement relative to the curing chamber; and inductive coils surrounding at least a portion of the at least one substrate within the curing chamber for indirectly heating the at least one substrate.

The inventive method requires that at least one substrate is inserted into the curing chamber by means of a support structure, the curing chamber defining a central axis; rotating the at least one substrate held by the support structure about the central axis, the at least one substrate being surrounded by curing means and by inductive coils arranged to surround at least a portion of the at least one substrate; curing the at least one substrate by combined action of the curing means expelling temperature controlled low velocity air toward the at least one substrate while the at least one substrate rotates about the central axis, and the inductive coils indirectly heating the at least one substrate; and retracting the at least one substrate from the curing chamber by withdrawal of the support structure.

In a preferred embodiment of the invention, the curing means comprise a perforated non-conductive plenum on which the inductive coils are supported (i.e., the plenum is made of a known material, sufficiently transparent to the heating effect of the inductive coils, so that the substrate is heated yet the plenum is not). The plenum communicates with the temperature controlled low velocity air. The air is delivered through a fluid inlet in a first side of the curing chamber, passes between the inductive coils and through the perforated plenum toward the at least one substrate, and continues around the at least one substrate to exhaust through a fluid and solvent outlet located radially opposite the fluid inlet. The above action provides a heating effect to the at least one substrate rotating about the central axis of the curing chamber while carrying away evaporating solvents.

The inductive coils may either surround the at least one substrate for its entire axial length (i.e., forming a helix around the at least one substrate) or may be positioned only at the entrance opening through which the at least one substrate is inserted. The first disposition allows the inductive coils to assist the curing means by heating the at least one substrate uniformly along its entire axial length. The second disposition allows the inductive coils to preheat the at least one substrate as it is axially inserted into the curing chamber. Either configuration is preferable for use herein.

Finally, the above described curing technique is also applicable to drying photoreceptor substrates during the substrate cleaning process. For purposes of primary cleaning, it is known that the use of Freon and CFCs now being used, must be replaced with an alternate cleaning method. Aqueous detergent cleaning is the mainline candidate, however, prior to the inventive concept described herein, large volumes of heated class 100 (i.e., extremely clean) air were required to complete the drying process. By utilizing induction heating in concert with temperature controlled low velocity air, this large volume of heated air is no longer required. This in turn will reduce critical space requirements and equipment cost while maintaining or improving throughput.

BRIEF DESCRIPTION OF THE DRAWINGS

Other objects, advantages and salient features of the invention will become apparent from the following detailed description, which taken in conjunction with the annexed drawings, discloses preferred embodiments of the invention.

Referring now to the drawings which form part of this original disclosure.

DETAILED DESCRIPTION OF THE PREFERRED EMBODIMENTS

Figure 1:
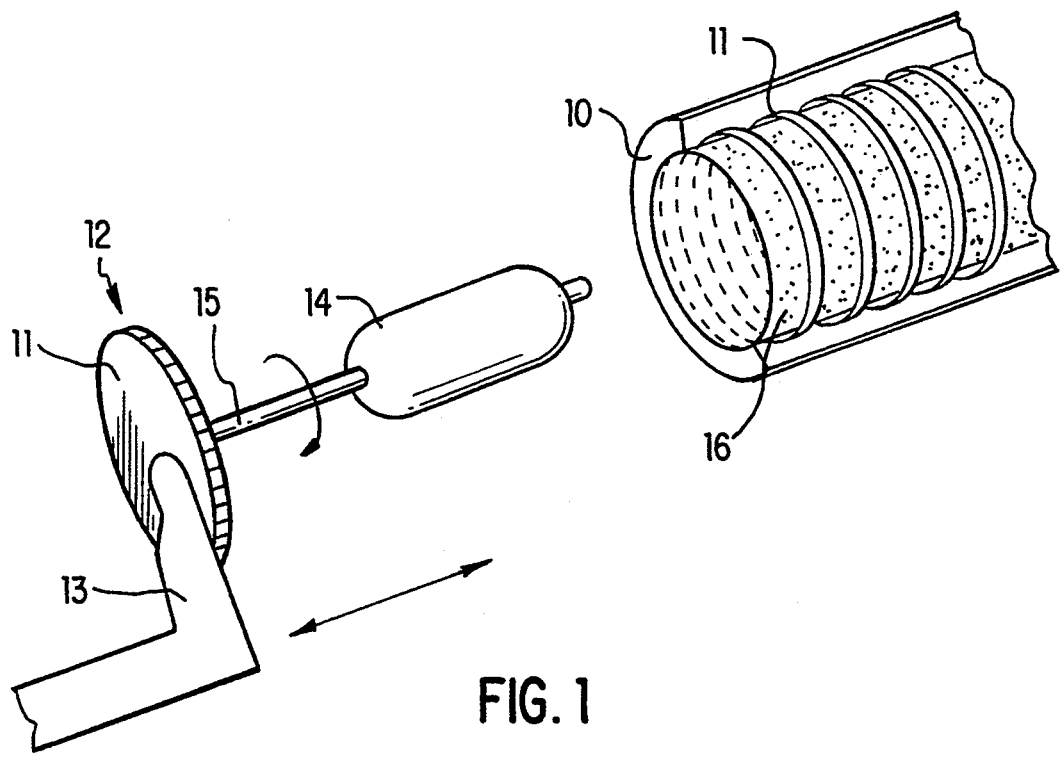
FIG. 1 is a schematic elevational view showing a substrate being inserted into a curing chamber in accordance with the invention.

The invention will be described in relation to fabrication of cylindrical and belt-like substrates, and particularly rigid cylindrical and flexible belt photoreceptor substrates for photocopiers. The invention, however, is applicable to other coated substrates and/or coating processes.

As illustrated in FIGS. 1-4, the overall process and apparatus for curing rigid cylindrical and flexible belt substrates includes a curing chamber 10 for receiving at least one support arm 15 bearing at least one substrate 14. A support structure 12 is provided that includes a movable base 13 for slidably moving between a closed position, where the at least one substrate 14 is fully inserted into the curing chamber 10, and an open position, where the at least one substrate 14 is fully retracted outside the curing chamber 10. The support structure 12 further includes a sealing means 11 for sealing the open end of curing chamber 10 after the at least one support arm 15 is inserted. In one preferred embodiment, the support arm 15 is non-conductive to heat.

Figure 3:
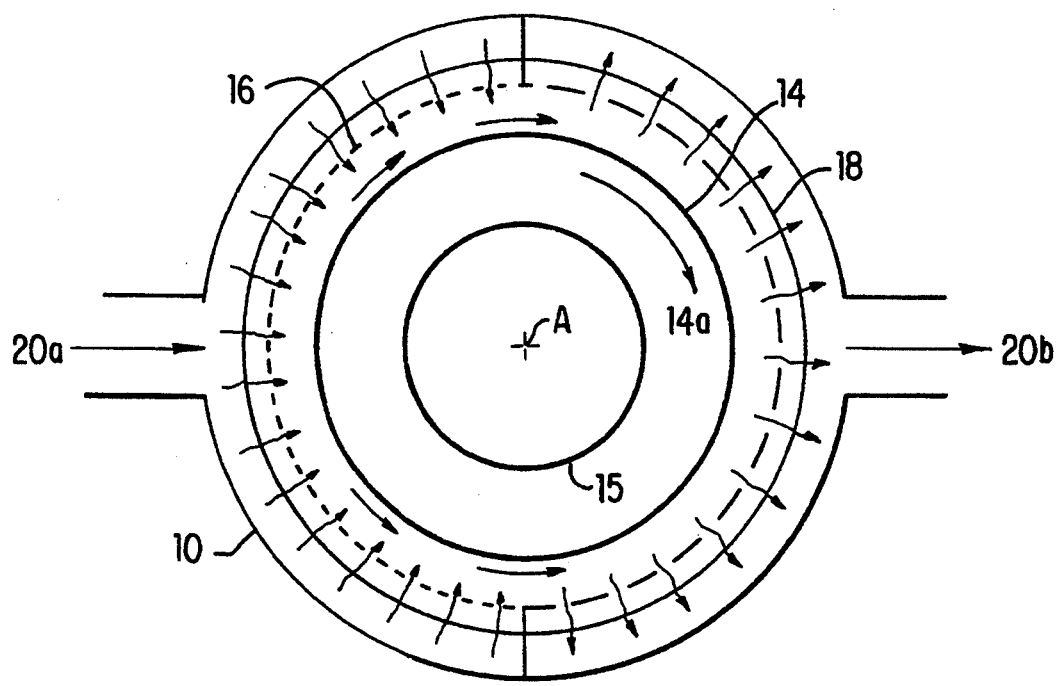
FIG. 3 is a schematic end-view of the curing chamber with a rotating substrate shown therein.
Figure 4:
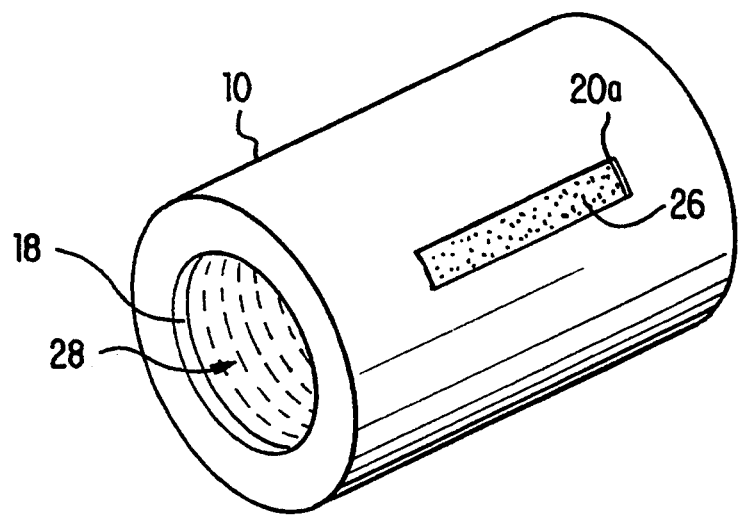
FIG. 4 is a schematic elevational view showing an induction coil at the entrance to the curing chamber for preheating substrates as they pass into the curing chamber.

Further, the curing chamber defines a central axis A (see FIG. 3). The support structure 12 is selectively receivable within the curing chamber 10 and is capable of supporting at least one substrate 14 along the central axis A with means provided for rotating the at least one substrate 14 about the central axis A (such means are well known in the art and will not be discussed here).

Curing means 16, which surround the at least one substrate 14 within the curing chamber 10, are provided for expelling temperature controlled low velocity air 20 toward the at least one substrate 14 as the at least one substrate rotates about central axis A, without axial movement relative to the curing chamber 10. That is, once the at least one substrate 14 is sealed inside the curing chamber 10, all axial movement of the at least one substrate 14 ceases. However, the at least one substrate continues to rotate about axis A until the support arm 15 is retracted and curing is complete (i.e., after a predetermined period). Additionally, inductive coils 18 are provided to surround at least a portion of the at least one substrate 14 within the curing chamber 10 for indirectly heating the at least one substrate 14 during curing.

In particular, the curing means 16 is preferably a perforated non-conductive plenum (see FIGS. 1-3) on which the inductive coils 18 are supported. The perforated plenum 16 communicates with the temperature controlled low velocity air 20, the air 20 (i.e., class 100 clean air as provided by a suitable known source) being delivered through a fluid inlet 20a. The air 20 passes between the induction coils 18, through the perforated plenum 16 via small impingement holes 26 located along the fluid inlet side of the perforated plenum 16, toward the at least one substrate 14. The temperature controlled low velocity air 20 envelopes and continues around the at least one substrate 14 and exhausts through exhaust openings 28 (located along the fluid outlet side of the perforated plenum 16) and out of the curing chamber 10 via fluid and solvent outlet 20b. The fluid and solvent outlet 20b is located radially opposite the fluid inlet 20a. Thus, a heating effect is provided to the at least one substrate 14 as it rotates about the central axis A (see direction arrow 14a) of the curing chamber 10, while evaporating solvents are carried away by action of the low velocity air 20 as it travels around and through the curing chamber 10.

Figure 2:
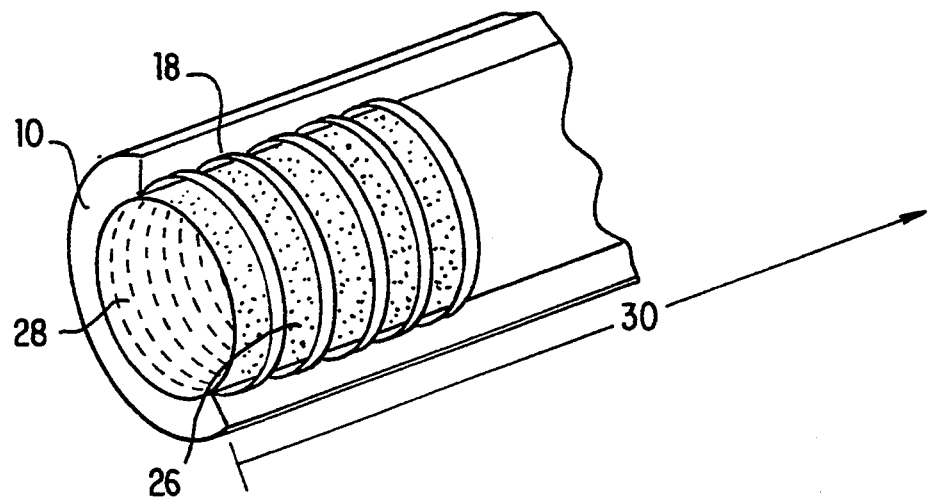
FIG. 2 is a schematic elevational view showing the helical induction coils disposed along the entire length of the perforated non-conductive plenum.

The inductive coils 18, in a preferred embodiment as shown in FIGS. 1 and 2, are disposed to surround the at least one substrate 14 for an entire axial length of the at least one substrate 14 (i.e., forming a helix around the at least one substrate 14). The coils 18 assist the curing means 16 by indirectly heating the at least one substrate 14 as the at least one substrate 14 rotates about the central axis A. Arrow 30 (see FIG. 2) indicates that the overall length of the curing chamber 10 is sufficient to receive a plurality of cylindrical substrates 14.

In another preferred embodiment of the invention (see FIG. 4), the inductive coils 18 are located only at the entrance opening of the curing chamber 10, for preheating the at least one substrate 14 as the at least one substrate 14 is axially inserted into the curing chamber 10.

Importantly, the curing technique described above, and shown in FIGS. 1-4, is similarly applicable to drying substrates during the substrate cleaning process as discussed above.

The invention has been described in relation to one substrate located along the central axis A. However, several substrates may be cured at one time. For example, two or more substrates can be aligned end-to-end along the central axis A. Also, two or more substrates can be located in the chamber such that the axes of the substrate are parallel to, but not colinear with, the central axis A. In this instance, the axes of the substrates preferably are located symmetrically about the central axis A.

Although the invention has been shown and described with respect to preferred embodiments thereof, it should be understood by those skilled in the art that various changes in the form and detail thereof may be made therein without departing from the spirit and scope of the invention as defined in the appended claims.

What is claimed is:

1. An apparatus for curing rigid cylindrical and flexible belt substrates, comprising:
    a curing chamber defining a central axis;
    a support structure selectively receivable within the curing chamber along the central axis of the curing chamber and including means for supporting at least one substrate along a substrate axis parallel to the central axis and means for rotating the at least one substrate about the substrate axis;
    curing means encircling the central axis to surround the at least one substrate within the curing chamber for expelling temperature controlled low velocity fluid toward the at least one substrate as the at least one substrate rotates about the substrate axis without axial movement relative to the curing chamber; and
    inductive coils encircling the central axis to surround at least a portion of the at least one substrate within the curing chamber for indirectly heating the at least one substrate.

2. The apparatus of claim 1, wherein the support structure comprises:
    a sealing means;
    a support arm; and
    a movable base, the base moving slidably between a first position where the at least one substrate is sealed within the curing chamber and a second position where the at least one substrate is retracted outside the curing chamber.

3. The apparatus of claim 1, wherein the inductive coils surround the at least one substrate for an entire axial length of the at least one substrate, the coils assisting the curing means by heating the at least one substrate as the at least one substrate rotates about the substrate axis.

4. The apparatus of claim 3, wherein the inductive coils form a helix around the at least one substrate.

5. The apparatus of claim 1, wherein the curing chamber has an entrance through which the at least one substrate is axially inserted, and the inductive coils are located at the entrance for preheating the at least one substrate as the at least one substrate is axially inserted into the curing chamber.

6. The apparatus of claim 1, wherein the curing means is a perforated plenum on which the inductive coils are supported.

7. The apparatus of claim 6, wherein the perforated plenum communicates with the temperature controlled low velocity fluid, the fluid being delivered through a fluid inlet in a first side of the curing chamber, passing around the inductive coils and through the perforated plenum to surround the at least one substrate, and exhausting through a fluid and solvent outlet located radially opposite the fluid inlet, the plenum and coils providing a heating effect to the at least one rotating substrate while carrying away evaporating solvents.

8. The apparatus of claim 1, wherein the substrate axis is colinear with the central axis.

9. The apparatus of claim 1, wherein the curing means is constructed of a non-conductive material such that the curing means is impervious to heating by the inductive coils.

10. The apparatus of claim 1, wherein the support structure is constructed of a non-conductive material such that the support structure is impervious to heating by the inductive coils.

11. A process for curing rigid cylindrical and flexible belt substrates, comprising the steps of:
    inserting at least one substrate into a curing chamber using a movable support structure, the curing chamber defining a central axis along which the substrate is inserted;
    encircling the central axis with curing means and rotating the at least one substrate held by the support structure about a substrate axis parallel to the central axis, the at least one substrate being surrounded by curing means;
    encircling the central axis with inductive coils arranged to surround at least a portion of the at least one substrate;
    curing the at least one substrate by combined action of the curing means expelling temperature controlled low velocity fluid toward the at least one substrate while the at least one substrate rotates about the substrate axis, and the inductive coils indirectly heating the at least one substrate; and
    retracting the at least one substrate from the curing chamber along the central axis after a predetermined time using the movable support structure.

12. The process of claim 11, wherein the inserting step includes a preheating step, whereby inductive coils are located at an entrance for preheating the at least one substrate as the at least one substrate is axially inserted into the curing chamber.

13. The process of claim 11, wherein inductive coils surround the at least one substrate for an entire axial length of the at least one substrate.

14. The process of claim 11, wherein the curing means comprises a perforated plenum on which the inductive coils are supported, the plenum communicating with the temperature controlled low velocity fluid as the fluid is delivered through a fluid inlet in a first side of the curing chamber, the curing step including the steps of passing the fluid around the inductive coils and through the plenum toward the at least one substrate to surround the at least one substrate, and exhausting the fluid through a fluid and solvent outlet located radially opposite the fluid inlet thereby providing a heating effect to the at least one rotating substrate while carrying away evaporating solvents.

15. The process of claim 11, wherein the substrate axis is colinear with the central axis.

16. The process of claim 11, wherein the curing means is constructed of a non-conductive material such that the curing means is impervious to heating by the inductive coils.

17. The process of claim 11, wherein the support structure is constructed of a non-conductive material such that the support structure is impervious to heating by the inductive coils.

18. An apparatus for curing rigid cylindrical and flexible belt substrates, comprising:
   a curing chamber defining a central axis;
   a support structure selectively receivable within the curing chamber and including means for supporting at least one substrate along a substrate axis parallel to the central axis and means for rotating the at least one substrate about the substrate axis, wherein the support structure comprises a sealing means, a support arm, and a movable base, the base moving slidably between a first position where the at least one substrate is sealed within the curing chamber and a second position where the at least one substrate is retracted outside the curing chamber;
   curing means surrounding the at least one substrate within the curing chamber for expelling temperature controlled low velocity fluid toward the at least one substrate as the at least one substrate rotates about the substrate axis without axial movement relative to the curing chamber; and
   inductive coils surrounding at least a portion of the at least one substrate within the curing chamber for indirectly heating the at least one substrate.

19. An apparatus for curing rigid cylindrical and flexible belt substrates, comprising:
   a curing chamber defining a central axis;
   a support structure selectively receivable within the curing chamber and including means for supporting at least one substrate along a substrate axis parallel to the central axis and means for rotating the at least one substrate about the substrate axis;
   curing means surrounding the at least one substrate within the curing chamber for expelling temperature controlled low velocity fluid toward the at least one substrate as the at least one substrate rotates about the substrate axis without axial movement relative to the curing chamber; and
   inductive coils surrounding the at least one substrate for an entire axial length of the at least one substrate within the curing chamber, wherein the inductive coils form a helix around the at least one substrate and wherein the coils assist the curing means by indirectly heating the at least one substrate as the at least one substrate rotates about the substrate axis.

20. An apparatus for curing rigid cylindrical and flexible belt substrates, comprising:
   a curing chamber defining a central axis, wherein the curing chamber has an entrance through which the at least one substrate is axially inserted;
   a support structure selectively receivable within the curing chamber and including means for supporting at least one substrate along a substrate axis parallel to the central axis and means for rotating the at least one substrate about the substrate axis;
   curing means surrounding the at least one substrate within the curing chamber for expelling temperature controlled low velocity fluid toward the at least one substrate as the at least one substrate rotates about the substrate axis without axial movement relative to the curing chamber; and
   inductive coils surrounding at least a portion of the at least one substrate within the curing chamber for indirectly heating the at least one substrate, the inductive coils being located at the entrance to the curing chamber for preheating the at least one substrate as the at least one substrate is axially inserted into the curing chamber.

21. An apparatus for curing rigid cylindrical and flexible belt substrates, comprising:
   a curing chamber defining a central axis;
   a support structure selectively receivable within the curing chamber and including means for supporting at least one substrate along a substrate axis parallel to the central axis and means for rotating the at least one substrate about the substrate axis;
   curing means surrounding the at least one substrate within the curing chamber for expelling temperature controlled low velocity fluid toward the at least one substrate as the at least one substrate rotates about the substrate axis without axial movement relative to the curing chamber;
   inductive coils surrounding at least a portion of the at least one substrate within the curing chamber for indirectly heating the at least one substrate; and
   wherein the curing means comprises a perforated plenum on which the inductive coils are supported, the perforated plenum communicating with the temperature controlled low velocity fluid, the fluid being delivered through a fluid inlet in a first side of the curing chamber, passing around the inductive coils and through the perforated plenum to surround the at least one substrate, and exhausting through a fluid and solvent outlet located radially opposite the fluid inlet, the plenum and inductive coils providing a heating effect to the at least one rotating substrate while carrying away evaporating solvents.

22. A process for curing rigid cylindrical and flexible belt substrates, comprising the steps of:
   inserting at least one substrate into a curing chamber using a movable support structure, the curing chamber defining a central axis, wherein the inserting step includes a preheating step, whereby inductive coils are located at an entrance to the curing chamber for preheating the at least one substrate as the at least one substrate is axially inserted into the curing chamber;
   rotating the at least one substrate held by the support structure about a substrate axis parallel to the central axis, the at least one substrate being surrounded by curing means and by inductive coils arranged to surround at least a portion of the at least one substrate;
   curing the at least one substrate by combined action of the curing means expelling temperature controlled low velocity fluid toward the at least one substrate while the at least one substrate rotates about the substrate axis, and the inductive coils indirectly pre-heating the at least one substrate; and retracting the at least one substrate from the curing chamber after a predetermined time using the movable support structure.

23. A process for curing rigid cylindrical and flexible belt substrates, comprising the steps of:
   inserting at least one substrate into a curing chamber using a movable support structure, the curing chamber defining a central axis;
   rotating the at least one substrate held by the support structure about a substrate axis parallel to the central axis, the at least one substrate being surrounded by curing means and by inductive coils arranged to surround at least a portion of the at least one substrate;
   curing the at least one substrate by combined action of the curing means expelling temperature controlled low velocity fluid toward the at least one substrate while the at least one substrate rotates about the substrate axis, and the inductive coils indirectly heating the at least one substrate, wherein the curing means comprises a perforated plenum on which the inductive coils are supported, the plenum communicating with the temperature controlled low velocity fluid as the fluid is delivered through a fluid inlet in a first side of the curing chamber, the curing step including the steps of passing the fluid around the inductive coils and through the plenum toward the at least one substrate to surround the at least one substrate, and exhausting the fluid through a fluid and solvent outlet located radially opposite the fluid inlet thereby providing a heating effect to the at least one rotating substrate while carrying away evaporating solvents; and
   retracting the at least one substrate from the curing chamber after a predetermined time using the movable support structure.

* * * * *